United States Patent

[11] 3,550,612

[72] Inventor Leroy James Maxon
 1615 N. 29th Ave., Hollywood, Fla. 33020
[21] Appl. No. 741,463
[22] Filed July 1, 1968
[45] Patented Dec. 29, 1970

[54] PURGE VALVE FOR COOLING FLUID CONDUIT SYSTEMS
 12 Claims, 3 Drawing Figs.
[52] U.S. Cl............................................. 137/112,
 115/0.5; 123/41.44, 137/240, 137/513.5; 165/95
[51] Int. Cl........................................ F01p 3/00
[50] Field of Search............................ 115/0.5,
 (Inquired); 123/41.14, (Inquired), 41, 44;
 184/196AB, 104B, (Inquired); 165/95,
 (Inquired); 137/112, 513.5, 240, (Inquired), 539,
 544, (Cursory); 134/166C, 167C, (Inquired),
 168C, 169C

[56] References Cited
 UNITED STATES PATENTS
 1,379,474  5/1921  Osborne....................  137/539X
 1,747,817  2/1930  Choquette..................  115/0.5X
 2,237,014  4/1941  Stoehrer.....................  137/112
 2,387,700  10/1945  Cribb........................  115/0.5
 3,242,914  3/1966  Benger.......................  115/0.5X
 3,323,502  6/1967  Whalen......................  123/41.44X
 2,872,962  2/1959  Laurent......................  137/513.3X
 FOREIGN PATENTS
 132,923  4/1933  Austria.......................  137/513.3

Primary Examiner—William F. O'Dea
Assistant Examiner—David J. Zobkiw
Attorney—Silverman & Cass ABSTRACT: A cooling system for an internal combustion marine engine which utilizes external or sea water as a coolant and which employs a novel purge valve assembly. The engine includes an intake line having an inlet port and a pump coupled with said intake line for drawing the external coolant water into said inlet port and pumping same through the cooling system of said engine. The purging valve is interposed in the intake line so that fresh water may be introduced into the cooling system to flush out the external coolant water, which, in most instances, is contaminated with salt or other corrosive materials.

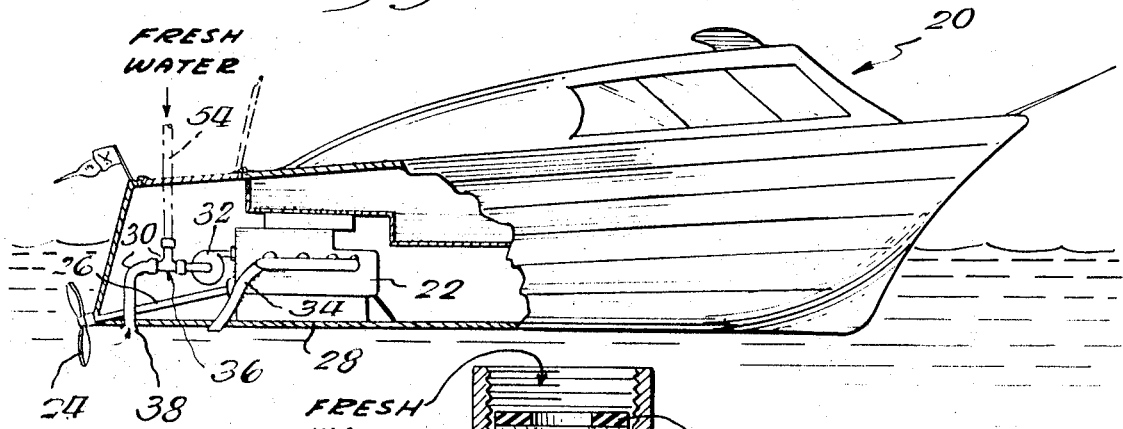
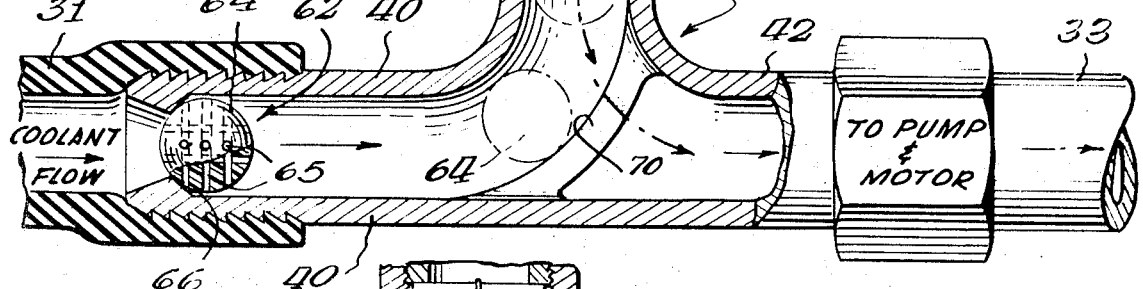
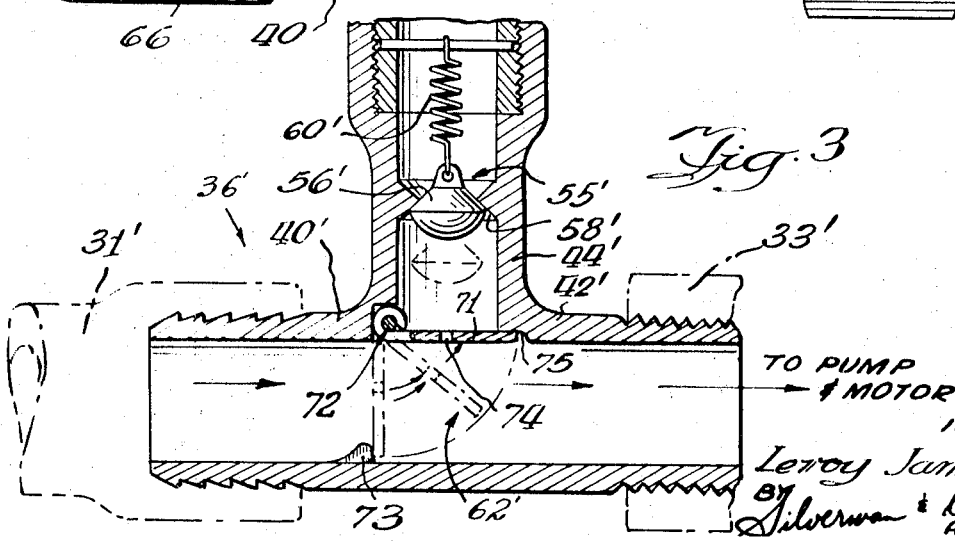

3,550,612

PURGE VALVE FOR COOLING FLUID CONDUIT SYSTEMS

BACKGROUND OF THE INVENTION

This invention relates generally to a cooling system for a marine engine, and more particularly, to an improved purging valve adapted for use in said system to permit the entire system to be flushed with fresh water.

Cooling of an internal combustion engine of the type to which the present invention relates is effected by use of the external water which is drawn in, circulated through the engine and discharged along with the exhaust gas into the body of water upon which the boat is operating. This external water, be it sea water, lake water, or the like, normally is contaminated with salt, harmful minerals and other foreign substances such as silt and sand. Accordingly, if this external water is allowed to remain in the engine cooling system for a prolonged period of time, there is a strong likelihood that a corrosive, electrolytic reaction can take place which will result eventually in costly repairs. Also, deposition and setting of these contaminants on the walls of the cooling system passageways is harmful and undesirable.

SUMMARY OF THE INVENTION

The invention is characterized by the provision of a novel purge valve assembly which is interposed in the intake line of a cooling system for an internal combustion marine engine whereby fresh water may be introduced into the cooling system to purge or flush the system of contaminated coolant water. The valve assembly employs at least three passages or branches, two of which form a portion of the fluid path leading from the inlet port to the pump and the third being associated with the other two and adapted to be connected to a source of fresh water for introduction of same into the cooling system. The purging valve assembly further includes at least two internal valve elements which control the flow of the fresh water and the external coolant water. One of said valve elements normally is arranged to close the third passageway, and is constructed and arranged to be forced to an open position upon the introduction of fresh water. The other valve element is associated with the upstream one of said two valve passages or branches and is normally arranged in an open position when the coolant water is flowing through the valve, but is adapted to be forced to a closed position upon the introduction of fresh water so as to permit same to be drawn into the engine. However, the second valve element is so constructed as to only partially block said upstream passageway when in said closed position thereof and thus permit leakage of fresh water past the valve element for purging or flushing the upstream segment of the intake line.

DESCRIPTION OF THE DRAWINGS

FIG. 1 is an elevational view of a boat with a portion of the hull broken away and showing a schematic representation of a marine engine employing the coolant system having the purge valve assembly embodying the invention.

FIG. 2 is a partial sectional view of one embodiment of purging valve assembly for use in the cooling system of FIG. 1.

FIG. 3 is a partial sectional view of a modified embodiment of purging valve assembly for use with the cooling system of FIG. 1.

DESCRIPTION OF THE ILLUSTRATED EMBODIMENTS

Referring now to the drawing, in FIG. 1 there is illustrated a boat 20 provided with an engine 22 employing the cooling system embodying the invention. The internal combustion marine engine 22 drives the screw 24 through a drive shaft 26 and a transmission (not shown). The coolant water flushed through marine engine 22 is obtained from the body of water upon which the boat is operated, said coolant hereinafter being referred to as the "external water" in order to distinguish same from the "fresh or purge water" used to purge the cooling system.

The cooling system for engine 22 includes an intake line 30, a pump 32, the marine engine water jackets or passages (not shown), the discharge or exhaust line 34 and the purging valve 36. Interposed in the intake line 30 between pump 32 and the inlet port 38 is the purging valve assembly designated generally 36 in FIG. 2 and 36' in FIG. 3. Each assembly is constructed to provide a portion of the conduit or line between inlet 38 and pump 32 and to facilitate introduction of fresh water into the cooling system.

Referring to FIG. 2, valve assembly 36 includes three passages or branches, designated 40, 42, and 44, respectively. When valve assembly 36 is interposed in the intake line 30, the branch 40 is coupled to an upstream segment 31 of said line, while branch 42 is coupled to a downstream segment 33, such that the branches or passages 40 and 42 actually define a portion of the fluid path between the pump 32 and the coolant inlet 38. The third branch 44 connects with branches 40 and 42 and provides conduit means for introducing fresh water into the cooling system.

The distal end of branch 44 is comprised of an internally threaded thimble 50 and a washer 52 which permit the male end of a fresh water line 54, per FIG. 1, to be coupled to branch 44 to facilitate connection of a fresh water source to conduit 44.

The valve assembly 36 employs two internal, flow control or valve elements for regulating fresh water and external water flow, one element being associated with branch 44 and the other element with branch 40. The valve or flow control element for branch 44 is designated generally 55 and normally is maintained in the closed position thereof under the influence of biasing means. It is forced to the open position thereof only upon the introduction of fresh water. The biasing means for said valve element 55 is designed such that the pressure in branch 44 established by pump 32 during normal operation is insufficient to unseat or open said valve element. In the embodiment of FIG. 2, the normally closed valve element 55 includes a valve member 56, a valve seat 58 and a spring 60 which biases valve member 56 into sealing engagement with the seat 58.

The valve or flow control element for branch 40 is designated generally 62 and is comprised primarily of a perforated ball valve member 64, having bores or passages 65. There is a valve seat 66 against which said member 64 engages to partially block passageway 40. In the normal condition, viz., with coolant or external water flowing through branches 40 and 42, the ball valve 64 will be moved into branch 44, as illustrated in phantom in FIG. 2, such that it will not obstruct coolant flow. If desired, an additional valve seat 68 may be provided in branch 44 immediately below the valve seat 58 to permit the perforated member 64 to augment the sealing action of the valve element 56, as discussed above.

To ensure that the ball valve member 64 takes the position illustrated in phantom in FIG. 2, a track or tracks 70 can be provided on the interior of the valve assembly 36 adjacent the point of juncture of the respective branches 40, 42, and 44. Track or tracks 70 are in the nature of a spider formation which can preclude passage of the ball valve element 64 into branch 42, yet permit the external coolant or fresh water to flow freely into said branch 42. In addition, the track or tracks 70 preferably are arcuate in shape so as to facilitate entry of the ball valve 64 into passage or branch 44. When the ball valve member 64 is engaged against the seat 66, the fluid pressure forcing said ball valve into engagement is sufficient to cause the fresh water to leak past the seat thus purging the upstream segment 31 of the intake line.

During normal operation of engine 22, external water is pulled into the cooling system by pump 32, by way of the intake line 30 which, in effect, includes the passages 40 and 42 of valve assembly 36. At this time, the spring 60 maintains the valve member 56 in engagement with seat 58 such that passageway or branch 44 is closed. Further, with coolant being drawn through the valve assembly 36, the ball valve 64 will be moved into branch 44 and engaged against seat 68 to further augment the sealing action of the valve element 55.

Upon introduction of fresh water into the branch 44 under sufficient pressure to overcome the bias of spring 60 and unseat member 56, fresh water will enter branches 40 and 42 and ball valve member 64 will be forced into engagement with seat 66, the position illustrated in full line in FIG. 2. Accordingly, the fresh water than may be drawn by pump 32 through the passageway 44 and into the engine 22 to purge the cooling system. It can be seen that if the ball valve member 64 was a solid element, the fresh water would be precluded from entering that portion of intake line 30 from the inlet port 38 to the valve 36. Since the ball valve element 64 is perforated, a limited quantity of the fresh water will leak past the seat 66 into the upstream segment 31 to flush or purge that portion of the cooling system of the contaminated external water.

Referring to FIG. 3, the valve assembly 36' differs from valve assembly 36 primarily in the particular type of internal valve element 62' employed for the partial blockage of passage 40', viz., valve element 62' is a gate valve member as opposed to the ball valve member 64 of FIG. 2. In all other respects, the two assemblies 36 and 36' are generally similar. The internal gate valve or flow control member 62' includes a disc or a plate 71 which is pivotally mounted at 72 for movement between two limits defined by the stops 73 and 75. Disc 71 includes a least one aperture 74 which provides for the reverse leakage, flushing action as discussed above with regard to the valve element 62. The valve element 62' may be positioned at various points along the branch 40' however, when positioned at the point of intersection with the respective branches, the disc 71 will pivot to the position illustrated in full line upon the introduction of a coolant and thereby aid in blockage of the branch 44.

In operation, when the coolant is passing through valve assembly 36', valve element 55' will be in the normally closed position blocking passage 44', and the disc 71 will be in the illustrated position wherein said disc augments the sealing action of the valve member 56'. Upon the introduction of fresh water under pressure into the branch 44', the valve member 56' will be moved away from the seat 58', while disc 71 will pivot into engagement with stop 73, thus permitting fresh water to enter branch 42'. With disc 71 in this position, the passage 40' is blocked partially with the aperture 74 providing the reverse leakage of fluid which permits the upstream segment 31' of the intake line to be purged of the contaminated external water.

It is believed that the cooling system with purge valve assembly embodying the invention provides an efficient and reliable means for elimination or purging of contaminated coolant water from the cooling system of a marine engine or the like. The invention in its broader aspects is not limited to the specific structural configuration illustrated and described, but departures may be made therefrom without departing from the spirit and scope of the invention which are defined solely by the appended claims.

I claim:

1. In an internal combustion marine engine having a cooling system comprised of a coolant intake line, a pump for drawing external water into said intake line and a coolant outlet for discharging the external water after circulation through said marine engine, the improvement comprising, a purging valve assembly interposed in said system, said valve assembly including three branches, the first branch being connected to an upstream segment of the intake line, the second branch being connected to the downstream segment of said line which communicates with said pump, the third branch communicating with said first and second branches and adapted to be coupled to a fresh water supply to introduce fresh water thereto, a normally closed first valve means in the third branch operable to open upon the coupling of said third branch to said fresh water supply, and second valve means located in the first branch operable to open upon the introduction of external water and close upon the introduction of fresh water, said second valve means being constructed and arranged to partially block said first branch upon the introduction of fresh water and thereby preclude further introduction of external water into said system, said partial blocking of the first branch permitting fresh water to leak past second valve means thereby purging the upstream segment of the intake line of said external water.

2. The combination according to claim 1 in which the second valve means comprises a movable, perforated valve member in the first branch and stop means for engaging said valve member to seat same at selectively one of its several operative positions dependent upon the direction of flow in said branches.

3. The combination as defined in claim 1 wherein said second valve means includes an apertured ball valve member, and a valve seat in said first branch against which said ball valve will engage upon the introduction of fresh water, and guide means for diverting said ball valve member into said third branch upon the introduction of external water through the intake line.

4. The combination as defined in claim 1 wherein said second valve means in the first branch comprises an apertured, pivotally mounted disc, said disc being operable to open upon the introduction of external water and close upon introduction of fresh water to partially block said first branch.

5. A purging valve as defined in claim 1 in which said first valve means comprises a spring-biased valve element and a valve seat for locating the valve element in its normally closed position.

6. The combination as defined in claim 1 in which said second valve means is pivotally mounted adjacent the intersection of said first and third branches.

7. A purging valve for use in the cooling system of a internal combustion marine engine which includes an intake line having an inlet port, a pump for drawing external water in through said intake line and forcing said external water through the cooling passages of said engine; said purging valve having means for interposing same in the said intake line between said inlet port and said pump and at least three passageways, the first passageway connectable to an upstream segment of said intake line, the second passageway connectable to the downstream portion of said intake line which communicates with said pump such that a fluid path from the inlet port to the pump may be established through said valve, and said third passageway communicating with said first and second passageways and adapted to be coupled to a source of fresh water, first internal normally closed valve means disposed in said third passageway and operable to open upon the coupling of said passageway to a fresh water line to introduce fresh water thereto, and second valve means located in the first passageway operable to open upon the introduction of external water and close upon the introduction of fresh water, said second valve means being constructed and arranged to partially block said first passageway upon the introduction of fresh water, whereby said pump may then only draw fresh water through the cooling system, said partial blockage permitting limited back flow of said fresh water relative said second valve means to flush the upstream segment of the intake line of external coolant water.

8. A purging valve as defined in claim 7 wherein said second valve means includes an apertured ball valve member, and a valve seat in said first passageway against which said ball valve will engage upon the introduction of fresh water, and guide means for diverting said ball valve member into said third passage upon the introduction of external coolant water through the intake line.

9. A purging valve as defined in claim 5 wherein said second valve means includes an apertured pivotally mounted disc in the first passageway, said second valve means being line condition responsive, operable to open in response to introduction of external coolant water and close upon the introduction of fresh water to partially block said first passageway.

10. A purging valve as defined in claim 7 in which said second valve means operable in conjunction with said first passageway comprises a porous, movable valve member operable to open in response to introduction of external water to the first passageway and partially block said third passageway and to close on introduction of fresh water by way of said third passageway and partially block said first passageway and stop formations for limiting said member to movement between open and close positions thereof.

11. A purging valve as defined in claim 7 in which said first valve means comprises a spring-biased valve element and a valve seat for locating the valve element in its normally closed position.

12. A purging valve as defined in claim 7 wherein said second valve means includes an apertured, line responsive, gate member, means pivotally mounting said gate member adjacent the intersection of said first and third passageways, said gate member operable upon introduction of external water to said first passageway partially to block said third passageway and operable to block said first passageway on introduction of said fresh water through said third passageway, said gate member permitting leakage therepast whereby to purge the respective partially blocked passageway.